United States Patent
Koike et al.

(10) Patent No.: US 7,544,237 B2
(45) Date of Patent: Jun. 9, 2009

(54) INK-JET RECORDING INK, INK-JET RECORDING PROCESS, AND INK-JET RECORDING APPARATUS

(75) Inventors: Shoji Koike, Yokohama (JP); Ryota Kato, Kawasaki (JP)

(73) Assignee: Canon Kabushiki Kaisha (JP)

( * ) Notice: Subject to any disclaimer, the term of this patent is extended or adjusted under 35 U.S.C. 154(b) by 482 days.

(21) Appl. No.: 11/388,747

(22) Filed: Mar. 24, 2006

(65) Prior Publication Data

US 2006/0219132 A1 Oct. 5, 2006

(30) Foreign Application Priority Data

Mar. 24, 2005 (JP) ............................. 2005-086916

(51) Int. Cl.
*C09D 11/02* (2006.01)
*G01D 11/00* (2006.01)
(52) U.S. Cl. .................. 106/31.58; 106/31.86; 347/100
(58) Field of Classification Search ............. 106/31.58, 106/31.86; 347/100
See application file for complete search history.

(56) References Cited

U.S. PATENT DOCUMENTS

| | | | | |
|---|---|---|---|---|
| 6,193,792 B1 * | 2/2001 | Fague | ....................... | 106/31.65 |
| 6,749,675 B2 * | 6/2004 | Momose | .................. | 106/31.58 |
| 2006/0176349 A1 * | 8/2006 | Nagai et al. | .................. | 347/100 |

FOREIGN PATENT DOCUMENTS

| | | | |
|---|---|---|---|
| JP | 54-059139 | A | 5/1979 |
| JP | 54-059936 | A | 5/1979 |
| JP | 55-027282 | A | 2/1980 |
| JP | 61-59911 | B2 | 12/1986 |
| JP | 61-59912 | B2 | 12/1986 |
| JP | 61-59914 | B2 | 12/1986 |
| JP | 3-043313 | A | 2/1991 |
| JP | 06-157955 | A | 6/1994 |
| JP | 11-012520 | A | 1/1999 |
| JP | 2894202 | B2 | 3/1999 |

* cited by examiner

*Primary Examiner*—J. A. Lorengo
*Assistant Examiner*—Veronica Faison Gee
(74) *Attorney, Agent, or Firm*—Rossi, Kimms & McDowell LLP

(57) ABSTRACT

An ink-jet recording ink which contains water, a coloring material and a surfactant, wherein the surfactant is in a content of from 0.6 to 5% by mass in the ink, and the ink further contains a block compound represented by the following formula (I):

$$HO-(EO)_a-(PO)_b-(EO)_c-H \qquad (I)$$

wherein EOs each represent an ethylene oxide moiety; PO represents a propylene oxide moiety; a, b and c satisfy $a \geqq 0$, $2 \leqq b \leqq 12$, $c \geqq 0$ and $1 \leqq a+c \leqq 60$; and the ethylene oxide moiety/-ies in one molecule is/are in a proportion of from 20 to 80% on the basis of mass. Also disclosed are an ink-jet recording process and an ink-jet recording apparatus which make use of this ink.

9 Claims, 2 Drawing Sheets

INK-JET RECORDING INK, INK-JET RECORDING PROCESS, AND INK-JET RECORDING APPARATUS

BACKGROUND OF THE INVENTION

1. Field of the Invention

This invention relates to an ink-jet recording ink, and an ink-jet recording process and an ink-jet recording apparatus which make use of the same. More particularly, this invention relates to an ink-jet recording ink (hereinafter simply "ink") which is suited for an ink-jet recording process, may cause no problem of curling of recording mediums even when a water base ink is applied in a large quantity to a cellulose-containing recording medium, and also can give a good response at the time of high drive frequency ink ejection and good sticking resistance to recording head.

2. Related Background Art

The ink-jet recording process is a process in which minute droplets of an ink are caused to fly and adhere to a recording medium such as paper to perform recording. An ejection system in which, using an electricity-heat converter as a means for feeding ejection energy, heat energy is imparted to the ink to produce air bubbles to eject the droplets is called a thermal system. According to this system, the recording head can easily be made multiple-nozzle in a high density, and images with a high resolution and a high quality can be recorded at a high speed (see, e.g., Japanese Patent Publications No. S61-59911, No. S61-59912 and No. S61-59914).

In recent years, in order to make adaptation to very high grade ink-jet recorded images at a level of silver salt photography, the droplets of ink ejected from a single nozzle have become small in size. At present, ink-jet printers of about 5 pl (picoliters) or less in ink droplet quantity are on the market. In regard to recording speed as well, printers are being demanded to be made much more high-speed. With such a demand, in regard to the ink, it is a matter of urgency to make adaptation to a higher drive frequency and to achieve an improvement in what is called sticking resistance, in virtue of which the sticking of ink can effectively be kept from occurring around the recording head.

As inks used in ink-jet recording, what are commonly available are those composed chiefly of water which is a medium for dissolving or dispersing a coloring material therein, and containing a water-soluble high-boiling solvent such as glycol added for the purposes of, e.g., preventing ink from drying and improving the sticking resistance to recording head. Then, in instances in which recording is performed using such inks on cellulose-containing recording mediums such as plain paper, light weight coated paper, and base paper absorption type coated paper, what is called the curling may occur in which the recording medium comes to warp when the ink is applied thereinto in a large quantity in a short time at its regions having a certain or larger area. The occurrence of such curling has not so much come into question in the recording of character and letter base images that has hitherto been prevalent, because the recording is performed in a small ink application amount. However, when internet home pages are recorded or photographic images are recorded as having come to be widely done in recent years, inks must be applied in a large quantity into plain paper or the like, and hence the occurrence of curling is one of large problems to be resolved.

To cope with such a problem, a water base ink composition is proposed which contains a curl preventive material of various types (see, e.g., Japanese Patent Application Laid-open Nos. H06-157955 and 11-12520). In inks making use of such a material, an effect is seen to a certain extent in respect of curling resistance (which means that the effect of keeping curl from occurring is seen). However, further improvement is desired in respect of achievement of both the response at the time of high drive frequency ink ejection or the sticking resistance and the curling resistance.

Meanwhile, a proposal is made on an ink containing a block compound (which has a small molecular weight for it to be called a block copolymer, and hence is called a block compound in the present invention) having an ethylene oxide moiety and a propylene oxide moiety in its structure (see, e.g., Japanese Patent Publication No. H03-43313 and Japanese Patent No. 2894202). However, in the ink disclosed in these publications, it has been desired to overcome at a higher level the technical subject of how to achieve both the response at the time of high drive frequency ink ejection or the sticking resistance and the curling resistance.

SUMMARY OF THE INVENTION

Accordingly, an object of the present invention is to provide an ink-jet recording ink which ink may cause no problem of curling even when the ink is applied into a cellulose-containing recording medium in a large quantity in a short time at its regions having a certain or larger area, and is adaptable to highly minute image recording while maintaining at a high level a good response at the time of high drive frequency ink ejection and high sticking resistance to recording head.

Another object of the present invention is to provide an ink-jet recording process which enables stable formation of high-grade images. Still another object of the present invention is to provide an ink-jet recording apparatus which can materialize such an ink-jet recording process.

The above objects can be achieved by the invention described below. That is, the present invention is an ink-jet recording ink which contains at least water, a coloring material and a surfactant, wherein the surfactant is in a content of from 0.6 to 5% by mass in the ink, and the ink further contains a block compound represented by the following formula (I):

$$HO—(EO)_a—(PO)_b—(EO)_c—H \quad\quad (I)$$

wherein EOs each represent an ethylene oxide moiety; PO represents a propylene oxide moiety; a, b and c satisfy $a \geq 0$, $2 \leq b \leq 12$, $c \geq 0$ and $1 \leq a+c \leq 60$; and the ethylene oxide moiety/-ies in one molecule is/are in a proportion of from 20 to 80% on the basis of mass.

As a preferred embodiment of the ink according to the present invention, the surfactant may be a nonionic surfactant. In such a case, the effect of the present invention is more remarkably brought in the case of an ink for thermal ink-jet recording.

The present invention is also an ink-jet recording process having the step of applying an ink to a cellulose-containing recording medium to perform recording by using an ink-jet recording head, wherein the recording area of the recording medium is 15 cm² or more, the ink is in a application amount of from 0.03 to 30 mg/cm², and the ink described above is used as the ink, The present invention is still also an ink-jet recording apparatus which comprises an ink storage portion holding therein the ink described above, and an ink-jet recording head from which the ink is to be ejected.

The thermal ink-jet recording system is a system in which an ink is caused to bubble by the aid of heat energy produced by a heater and the ink is caused to fly by the pressure thereby produced. The ink is exposed to a high temperature and a high pressure at the time of bubbling, and hence, though uncertain as to quantity, deposits somewhat come at every bubbling which are caused by ink constituent materials. These deposits are sparingly soluble to water, and hence they cause kogations on the heater and further may cause faulty bubbling and a lowering of ejection quantity to shorten the lifetime of the head. The use of the ink constituted according to the present invention also enables such phenomena to be kept from occurring.

According to the present invention, a water base ink is provided which, when used in ink-jet recording, may cause no problem of curling even when the water base ink is applied to a cellulose-containing recording medium in a large quantity, and is adaptable to highly minute image recording while maintaining at a high level a good response at the time of high drive frequency ink ejection and high sticking resistance to recording head. As to the response at the time of high-frequency ink ejection, its effect is remarkable especially when used in ink-jet recording of the thermal ink-jet recording system.

DESCRIPTION OF THE PREFERRED EMBODIMENTS

Figure 1:
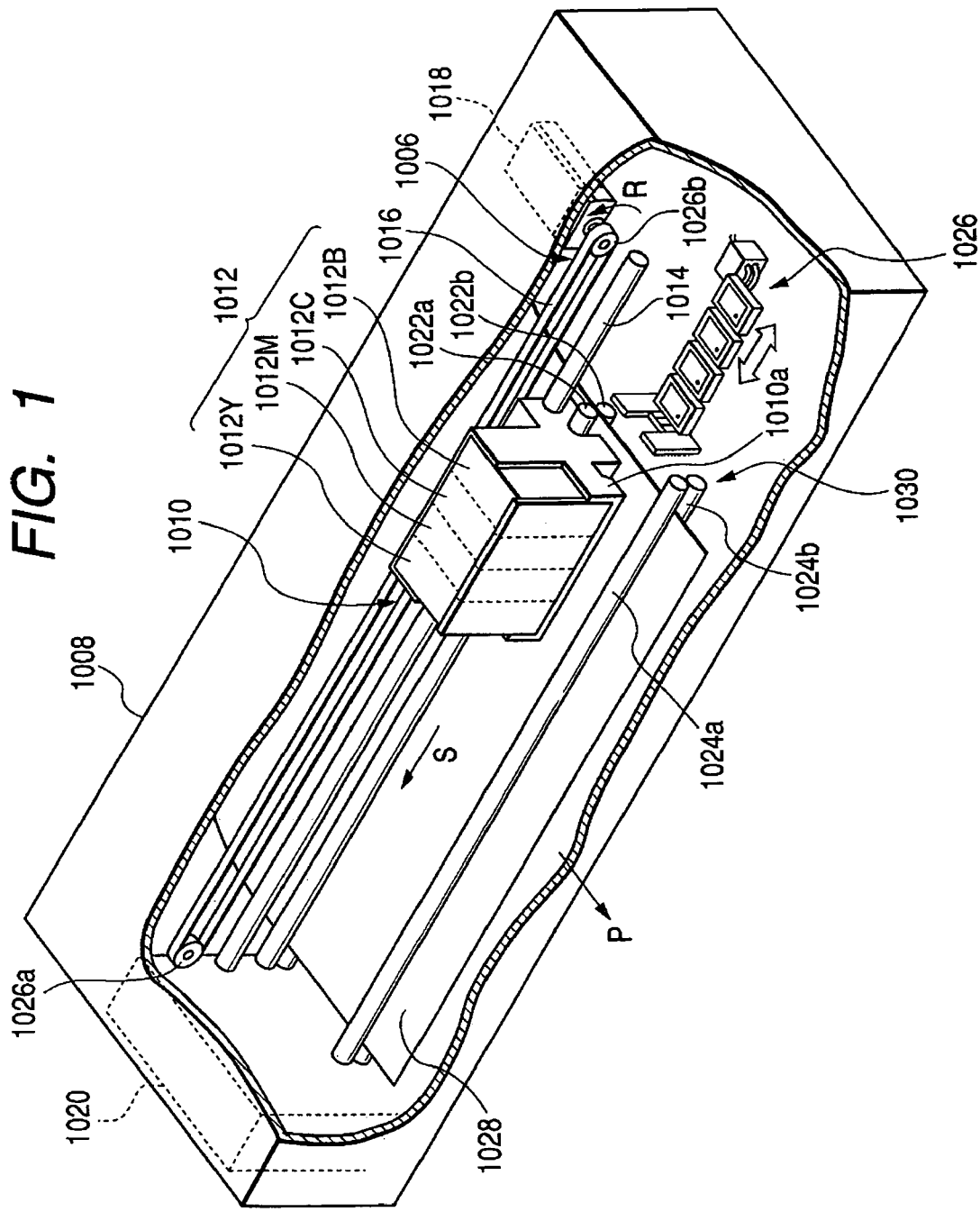
FIG. 1 is a schematic perspective view showing the main part of an example of an ink-jet printer on which an ink ejection head is mountable.

The present invention is described below in greater detail by giving preferred embodiments.

The present inventors have energetically made studies on technical problems brought about against the background of such future technical trends as stated above, in order to develop an ink-jet recording ink which ink is adaptable to highly minute image recording while maintaining at a high level the basic properties required as inks for ink-jet recording, stated specifically, the good response at the time of high drive frequency ink ejection (stated specifically, at a frequency that may exceed 10 kHz), the sticking resistance to recording head, and so forth, without causing the problem of curling of recording mediums even when inks are applied to a cellulose-containing recording medium in a large quantity. As the result, they have discovered that an ink so composed as to contain a compound having specific properties can achieve the above object at a very high level, and have accomplished the present invention. The outlines of subjects intended to resolve in the present invention are individually described here.

1. Curling Resistance:

When the water base ink is applied in a large quantity to the cellulose-containing recording medium typified by plain paper, the phenomenon called curl (i.e., curling) may occur in which the recording medium comes to warp. If the curling occurs strongly, the paper comes to curl into a cylinder in some cases.

The mechanism of curling is considered to come from the fact that, in the step of drying paper at the stage of paper making, the water evaporates in the state that tension is applied thereto in a certain direction, so that hydrogen linkages are formed between cellulose molecular chains. Upon adhesion of the water base ink to the paper standing in this way, the hydrogen linkages formed between cellulose molecular chains are broken by the water and the linkage moieties are replaced by the water. However, upon evaporation of the water, the hydrogen linkages are again formed between cellulose molecular chains. No tension acts when the hydrogen linkages are again formed, and hence the paper shrinks on its ink-adhered side, so that the curling occurs, as so considered.

In conventional recording in which the images to be formed are of character and letter bases, this phenomenon has not attracted notice because an ink is applied in a relatively small quantity. However, in these days where graphic printing performed applying inks in a large quantity, this phenomenon comes into question of great importance. Thus, the inks are demanded to be remarkably improved in curling resistance in forming images. In particular, the curling occurs greatly in instances in which the ink-jet recording is performed on the recording medium such as plain paper, which contains cellulose, under conditions of a recording area of 15 $cm^2$ or more and a water base ink application amount of 0.03 to 30 $mg/cm^2$. That is, the present invention can bring out an especially remarkable effect when the ink-jet recording is performed under such conditions. Where the water base ink application amount is 0.1 to 20 $mg/cm^2$, the present invention can bring out its effect more remarkably.

2. Frequency Response:

Where it is attempted to eject an ink continuously at a high drive frequency in an on-demand type ink-jet recording system, the ink, depending on its physical and chemical properties, may come not to be refilled in nozzles in time, and the next ejection may start before the ink is refilled. As the result, it may come about that the ink is poorly ejected or ejected in an extremely small quantity. Also, such a phenomenon occurs more remarkably as the ink is ejected in smaller droplets. Hence, this comes into question especially in ink-jet printers like those in which the droplet quantity of the ink ejected from a single nozzle is about 5 pl (picoliters) or less, which have been developed in order to make adaptation to very high-grade ink-jet recorded images at a level of silver salt photography.

3. Sticking Resistance (Nozzle-Clogging Resistance):

As a problem caused by the evaporation of water of ink that comes at nozzle tips, nozzle clogging may occur. Such a problem is a problem that may arise when a printer is left without use for a certain period of time, when, in the case of a printer of a type in which its ink tank and printing head are set integral, the printer is left in the state the printing head itself has been detached therefrom, or when, in the case of a printer of a type in which its ink tank and printing head are set separable, the printer is left in the state the ink tank has been detached therefrom. Such problems dues to a stick of the coloring material caused at the nozzle tip by water evaporation. On the problems stated above, the present inventors have made extensive studies from the viewpoint of the composition of ink. As the result, they have discovered that an ink in which a compound having specific properties is contained in specific composition can achieve the above object at a very high level. The ink according to the present invention is described below.

The ink according to the present invention is characterized by containing at least water, a coloring material and from 0.6 to 5% by mass of a surfactant, and further containing, in addition to these, in its structure a block compound having a moiety consisting of ethylene oxide (an ethylene oxide unit) and a moiety consisting of propylene oxide (a propylene oxide unit). These components are described first.

It is essential for the ink according to the present invention to contain a block compound represented by the following formula (I), which characterizes the present invention. This compound is a compound having a structured wherein ethylene oxide units consisting of 1 to 60 EOs in total and a propylene oxide unit consisting of 2 to 12 POs are added in the form of a block.

$$HO-(EO)_a-(PO)_b-(EO)_c-H \qquad (I)$$

wherein EOs each represent an ethylene oxide moiety; PO represents a propylene oxide moiety; a, b and c satisfy $a \geq 0$, $2 \leq b \leq 12$, $c \geq 0$ and $1 \leq a+c \leq 60$; and the ethylene oxide moiety/-ies in one molecule is/are in a proportion of from 20 to 80% on the basis of mass.

Here, the EO constituting each ethylene oxide unit and the PO constituting the propylene oxide unit are organic groups having the following structure.

EO moiety: $-CH_2-CH_2-O-$
PO moiety: $-CH_2-CH(CH_3)-O-$

The block compound having the structure as shown above may be synthesized by a conventional method. It may include, e.g., as block compounds usable in the present invention, compounds (1) to (14) in which the a, b and c in the above formula (I) are the values as shown respectively in Table 1. Of course, in the present invention, examples are by no means limited to these. In Table 1, the proportion of EO moiety/-ies is also shown on the basis of mass. Incidentally, in the present invention, it is preferable that both of the a and c are not 0 at the same time.

TABLE 1

Structure of Each Compound Represented by Formula (I), and EO Moiety Proportion

| | a | b | c | a + c | EO moiety proportion (%) |
|---|---|---|---|---|---|
| Compound (1): | 2 | 2 | 2 | 4 | 57 |
| Compound (2): | 2 | 2 | 4 | 6 | 66 |
| Compound (3): | 0 | 2 | 8 | 8 | 72 |
| Compound (4): | 0 | 2 | 1 | 1 | 25 |
| Compound (5): | 1 | 3 | 2 | 3 | 41 |
| Compound (6): | 3 | 3 | 3 | 6 | 58 |
| Compound (7): | 3 | 3 | 6 | 9 | 67 |
| Compound (8): | 4 | 4 | 4 | 8 | 58 |
| Compound (9): | 4 | 4 | 8 | 12 | 68 |
| Compound (10): | 5 | 5 | 5 | 10 | 59 |
| Compound (11): | 6 | 6 | 6 | 12 | 59 |
| Compound (12): | 4 | 8 | 12 | 16 | 59 |
| Compound (13): | 20 | 11 | 40 | 60 | 80 |
| Compound (14): | 6 | 12 | 18 | 24 | 60 |

The block compound represented by the above formula (I), used in the present invention, as exemplified by the foregoing may preferably be contained in the ink in an amount of from 0.5 to 40% by mass based on the total mass of the ink. It may more preferably be contained in the ink in an amount of from 1 to 35% by mass, and still more preferably from 1.5 to 30% by mass, based on the total mass of the ink.

As described above, in the present invention, it is one of characteristic features that the block compound having on its molecular structure the propylene oxide unit with a PO addition number of 2 to 12. Block compounds having a propylene oxide unit on the molecular structure are also used in conventional inks for ink-jet recording. In such a case, however, all are used as surfactant, and those having a PO addition number of 15 to 65 are commonly used. Thus, the block compound having the propylene oxide unit with a PO addition number of 2 to 12 has not particularly attracted notice as its use for inks. More specifically, according to studies made by the present inventors, if the propylene oxide unit has a PO addition number of more than 12, the curling may more or less be kept from occurring, but the ink has so high a viscosity that any partial evaporation of ink constituents at nozzle tip portions may cause faulty ejection and make the ink have an inferior response at the time of high frequency ink ejection.

(Aqueous Medium)

The ink according to the present invention contains water as an essential component. The water may preferably be contained in the ink in an amount of from 30% by mass or more, and also preferably 95% by mass or less, based on the total mass of the ink. An aqueous medium in which the water and a water-soluble solvent are used in combination is often used. Such a constituent material used in combination with the water may include, e.g., alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol and n-pentyl alcohol; amides such as dimethylformamide and diethylacetamide; ketones or ketoalcohols such as acetone and diacetone alcohol; ethers such as tetrahydrofuran and dioxane; oxyethylene or oxypropylene polymers such as diethylene glycol, triethylene glycol, tetraethylene glycol, dipropylene glycol, tripropylene glycol, polyethylene glycol and polypropylene glycol; alkylene glycols whose alkylene groups have 2 to 6 carbon atoms, such as ethylene glycol, propylene glycol, trimethylene glycol, 1,4-butanediol, 1,5-pentanediol and 1,6-hexanediol; triols such as 1,2,6-hexanetriol, glycerol and trimethylol propane; lower alkyl ethers of glycols, such as ethylene glycol monomethyl (or -ethyl) ether, diethylene glycol monomethyl(or -ethyl) ether and triethylene glycol monomethyl(or -ethyl) ether; lower dialkyl ethers of polyhydric alcohols, such as triethylene glycol dimethyl (or -ethyl) ether and tetraethylene glycol dimethyl (or -ethyl) ether; alkanol amines such as monoethanolamine, diethanolamine and triethanolamine; and sulfolane, N-methyl-2-pyrrolidone, 2-pyrrolidone, 1,3-dimethyl-2-imidazolidinon, urea, ethylene urea, bishydroxyethyl sulfone, and diglycerol. In particular, it is preferable to use ethylene glycol, polyethylene glycol (average molecular weight: 200 to 1,000), glycerol, 1,2,6-hexanetriol, ethylene urea or trimethylol propane. In particular, ethylene urea is most preferred.

In the ink according to the present invention, there are no particular limitations on the content of the water-soluble solvent used in combination with the water. It may preferably be from 3% by mass or more, and also preferably 60% by mass or less, based on the total mass of the ink.

(Surfactant)

In order to achieve a better balanced ejection stability, it is essential for the ink according to the present invention to be incorporated with 0.6 to 5% by mass of a surfactant in the ink, in addition to the components described above. In the present invention, of the surfactant, a nonionic surfactant may preferably be incorporated. Further, of the nonionic surfactant, a polyoxyethylene alkyl ether and an ethylene oxide addition product of acetylene glycol are particularly preferred. These nonionic surfactants have an HLB (hydrophilic-lipophilic balance) value of 10 or more. Any of these surfactants is required to be contained in the ink in an amount of from 0.6 to 5% by mass, preferably from 0.7 to 4% by mass, and more preferably from 0.8 to 3% by mass.

(Other Additives)

To the ink according to the present invention, in order for the ink to have the desired physical properties, a viscosity modifier, an ant-foaming agent, an anticeptic agent, a mildew-proofing agent, an antioxidant and so forth may optionally be added as additives, in addition to the components described above. The additives may preferably be so selected that the ink may have a surface tension of 25 mN/m or more, and preferably 28 mN/m or more.

(Coloring Material)

Next, as the coloring material to be incorporated in the ink according to the present invention, dyes and pigments may be used. The coloring material may be contained in the ink in an amount of, but not limited to the range of, from 0.1 to 15% by mass, preferably from 0.2 to 12% by mass, and more preferably from 0.3 to 10% by mass.

As the dyes usable in the ink according to the present invention, almost all of water-soluble, acid dyes, direct dyes, basic dyes and reactive dyes listed in COLOR INDEX may be used. Even those not listed in COLOR INDEX may also be used as long as they are water-soluble.

Specific examples of the dyes used in the present invention are given below. Dyes used in yellow ink may include, e.g., C.I. Direct Yellow 173, 142, 144, 86, 132, and C.I. Acid Yellow 23, 17. Dyes used in magenta ink may include, e.g., C.I. Acid Red 92, 289, 35, 37, 52. Dyes used in cyan ink may include, e.g., C.I. Acid Blue 9, 7, 103, 1, 90, C.I. Direct Blue 86, 87, 199. Dyes used in black ink may include, e.g., C.I. Food Black 2, C.I. Direct Black 52, 154, 195. However, those usable in the present invention are by no means limited to these.

As the coloring material to be incorporated in the ink according to the present invention, pigments as enumerated below may also be used. As pigments used in black ink, preferably usable are carbon black pigments such as furnace black, lamp black, acetylene black and channel black, and those having a primary particle diameter of from 15 to 40 nm, a specific surface area of from 50 to 300 $m^2/g$ as measured by the BET method, a DBP oil absorption of from 40 to 150 ml/100 g and a volatile content of from 0.5 to 10% by mass.

As pigments used in color inks, organic pigments may preferably be used. Stated specifically, they may be exemplified by insoluble azo pigments such as Toluidine Red, Toluidine maroon, Hanza Yellow, Benzidine Yellow and Pyrazolone Red; soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; and indigo type pigments, condensation azo type pigments, thioindigo type pigments, diketopyrrolopyrrole type pigments, Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet.

The organic pigments, when shown by Color Index (C.I.) Number, may be exemplified by C.I. Pigment Yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, 185; C.I. Pigment Orange 16, 36, 43, 51, 55, 59, 61, 71; C.I. Pigment Red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, 272; C.I. Pigment Violet 19, 23, 29, 30, 37, 40, 50; C.I. Pigment Blue 15, 15:1, 15:3, 15:4, 15:6, 22, 60, 64; C.I. Pigment Green 7, 36; and C.I. Pigment Brown 23, 25, 26. Even those other than the above pigments may be used. In particular, of these pigments, C.I. Pigment Yellow 13, 17, 55, 74, 93, 97, 98, 110, 128, 139, 147, 150, 151, 154, 155, 180, 185; C.I. Pigment Red 122, 202, 209; and C.I. Pigment Blue 15:3, 15:4, are more preferred.

In the case when the pigment is used as the coloring material, the pigment may preferably have average particle diameter in the range of from 50 to 200 nm. As a method of measureing the average particle diameter, it may be measured with ELS-8000 (manufactured by Otsuka Electronics Co., Ltd.), MICROTRACK UPA 150 (manufactured by Nikkiso Co., Ltd.) or the like, which utilizes the scattering of laser light.

(Dispersant)

As a dispersant for dispersing the pigment, there are no particular limitations thereon as long as it is water-soluble. Stated specifically, it may include block copolymers, random copolymers and graft copolymers, or salts of these, composed of at least two monomers (at least one of which is a hydrophilic monomer) selected from styrene, styrene derivatives, vinyl naphthalene, vinyl naphthalene derivatives, aliphatic alcohol esters of $\alpha,\beta$-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acryl amide, acryl amide derivatives, and so forth. Of these, dispersants particularly preferable in practicing the present invention are the block copolymers. Especially when, in a head making use of heat energy, it is driven at a high drive frequency of, e.g., 10 kHz or more, the use of any of the above block copolymers in the present invention more remarkably brings the effect of improving ejection performance.

As preferable content of the dispersant in the ink, it may be in the range of from 0.5 to 10% by mass, preferably from 0.8 to 8% by mass, and more preferably from 1 to 6% by mass. If the dispersant is in a content larger than this range, it may be difficult to maintain the desired ink viscosity.

The ink according to the present invention can be well effective when used in ink-jet recording. As to an ink-jet recording apparatus used here, an ink-jet printer is described as a specific example. FIG. 1 is a schematic perspective view showing the main part of an example of an ink-jet printer which is an ink ejection apparatus making use of an ink ejection head of an ejection system in which air bubbles communicate with the atmosphere at the time of ejection.

In FIG. 1, the ink-jet printer is so constituted as to comprise a transport assembly 1030 provided along the lengthwise direction in a casing 1008 and transports a sheet 1028 as a recording medium intermittently in the direction shown by an arrow P, a recording part 1010 which is reciprocatingly moved substantially in parallel along a guide shaft 1014 in the direction of an arrow S that falls at substantially right angles with the direction P in which the sheet 1028 is transported by the transport assembly 1030, and a movement drive part 1006 as a drive means which reciprocatingly move the recording part 1010.

The transport assembly 1030 has a pair of roller units 1022*a* and 1022*b* and a pair of roller units 1024*a* and 1024*b* which are opposingly disposed substantially in parallel to each other, and a driving part 1020 for driving these respective roller units. With such constitution, the driving part 1020 of the transport assembly 1030 is brought into operation, whereupon the sheet 1028 is held between the respective roller units 1022*a* and 1022*b* and the roller units 1024*a* and 1024*b*, and is transported in the direction of the arrow P under intermittent feeding. The movement drive part 1006 is so constituted as to comprise a belt 1016 passed about a pulley 1026*a* and a pulley 1026*b* which are provided on rotating shafts disposed opposingly at a given distance, and a motor 1018 which drives the belt 1016 in the regular direction and reverse direction; the belt 1016 being connected to a carriage member 1010*a* of the recording part 1010 disposed substantially in parallel to the roller unit 1022*a* and roller unit 1022*b*.

When the motor 1018 is brought into operation and the belt 1016 is rotated in the direction of an arrow R, the carriage member 1010*a* of the recording part 1010 is moved in the direction of the arrow S by a given movement. Also, when the motor 1018 is brought into operation and the belt 1016 is rotated in the direction reverse to the direction of the arrow R, it comes that the carriage member 1010*a* of the recording part 1010 is moved in the direction reverse to the direction of the arrow S by a given movement. Further, at one end of the movement drive part 1006, a restoration unit 1026 for performing ejection restoration treatment of the recording part 1010 is provided at the position that corresponds to the home position of the carriage member 1010*a*, facing an arrangement of ink ejection orifices of the recording part 1010.

In the recording part 1010, ink-jet cartridges (hereinafter also simply "cartridges" as occasion calls) 1012Y, 1012M, 1012C, 1012B are detachably mounted to the carriage member 1010*a* for each color of, e.g., yellow, magenta, cyan and black, respectively.

Figure 2:
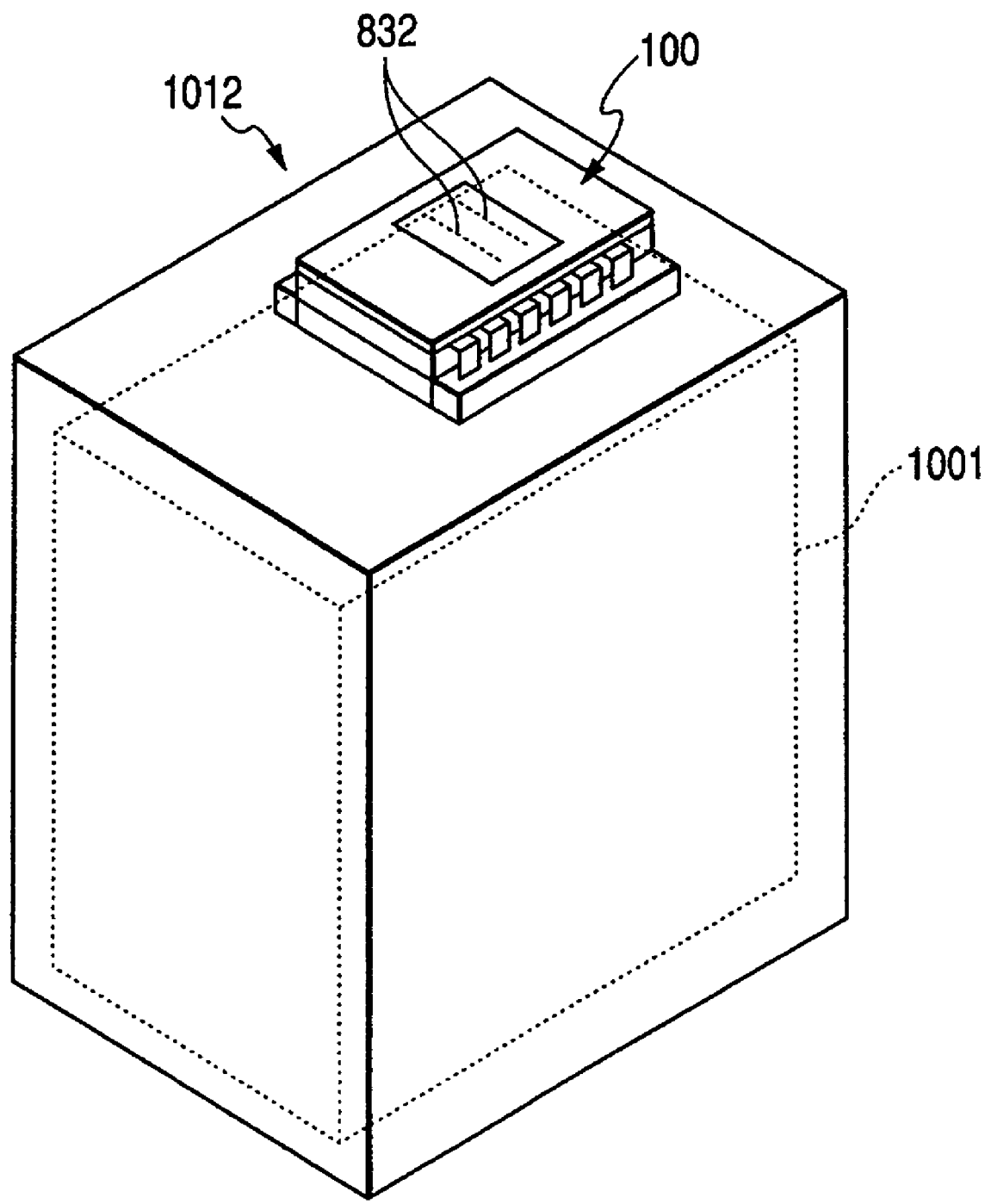
FIG. 2 is a schematic perspective view showing an example of an ink-jet cartridge having an ink ejection head.

FIG. 2 shows an example of an ink-jet cartridge mountable to the above ink-jet recording apparatus. A cartridge 1012 in the example shown in FIG. 2 is a cartridge of a serial type, which is chiefly constituted of an ink-jet recording head 100 and an ink tank 1001 holding therein an ink.

In the ink-jet recording head 100, a large number of ejection orifices 832 for ejecting the ink therefrom are formed. It is so designed that the ink is led from the ink tank 1001 to a common ink chamber (not shown) of the ink-jet recording head 100 via ink feed channels (not shown). The cartridge 1012 shown in FIG. 2 is so set up that the ink-jet recording head 100 and the ink tank 1001 are integrally formed and the ink tank 1001 can optionally be replenished therein with the ink. Alternatively, the ink tank 1001 may also be so designed as to employ a structure wherein the ink tank 1001 is exchangeably connected to the ink-jet recording head 100. Incidentally, the ink-jet cartridge having the ink-jet recording head is a recording unit.

EXAMPLES

The present invention is described below in much greater detail by giving Examples and Comparative Examples. Incidentally, what is indicated as "%" in the following is by mass, unless particularly noted. Also, "balance" refers to the remainder found when the whole is regarded as 100% and percentages of respective components are subtracted therefrom.

Example 1

Preparation of Pigment Dispersion 1:

First, using benzyl methacrylate and methacrylic acid as raw materials, an AB type block polymer having an acid value of 250 and a weight average molecular weight of 3,000 was produced by a conventional method. This was further neutralized with an aqueous potassium hydroxide solution, and diluted with ion-exchanged water to make up a homogeneous aqueous 50% polymer solution. Then, 180 g of the aqueous polymer solution obtained, 100 g of C.I. Pigment Blue 15:3 and 220 g of ion-exchanged water were mixed, and then stirred by a mechanical means for 0.5 hour. Next, using a micro-fluidizer, the mixture obtained was treated by passing it five times through the interior of an interaction chamber under a liquid pressure of about 10,000 psi (about 70 MPa). Further, the dispersion thus obtained was centrifuged (12,000 rpm, for 20 minutes) to thereby remove undispersed matter containing coarse particles, to obtain cyan colored, Pigment Dispersion 1. Pigment Dispersion 1 obtained had a pigment concentration of 10% and a dispersant concentration of 10%.

Preparation of Ink 1:

To prepare Ink 1, the cyan colored, Pigment Dispersion 1 obtained as above was used and the following components were added thereto so as to be in stated concentrations. These components were thoroughly mixed and stirred, and thereafter the mixture obtained was filtered under pressure by using a micro-filter (available from Fuji Photo Film Co., Ltd.) of 2.5 µm in pore size. As the result, Ink 1 was obtained, which had a pigment concentration of 2% and a dispersant concentration of 2%. Compound (1) used in the following composition is one having the following structure, and its EO moieties were in a proportion of 57% on the basis of mass. Also, what is indicated as "balance" in the following composition means that the concentrations of the respective components constituting the ink were so controlled with water as to come to 100% in total. Still also, what is indicated as "EO addition" in the following composition refers to ethylene oxide addition. These "balance" and "EO addition" apply alike also in the preparation of other inks.

| Compound (1): HO—$(EO)_2$—$(PO)_2$—$(EO)_2$—H | |
|---|---|
| Above Pigment Dispersion 1 | 20% |
| Compound (1) | 16% |
| Acetylene glycol EO adduct | 0.5% |
| (trade name; ACETYLENOL EH, available from Kawaken Fine Chemicals Co., Ltd.; a nonionic surfactant; HLB ≧ 10) | |
| Polyoxyethylene cetyl ether | 0.5% |
| (number of EO addition: 30; a nonionic surfactant; HLB: 19.5) | |
| Ion-exchanged water | balance |

Example 2

Preparation of Pigment Dispersion 2:

100 g of the same aqueous polymer solution as that used in the preparation of Pigment Dispersion 1, 100 g of C.I. Pigment Red 122 and 300 g of ion-exchanged water were mixed, and then stirred by a mechanical means for 0.5 hour. Next, using a micro-fluidizer, the mixture obtained was treated by passing it five times through the interior of an interaction chamber under a liquid pressure of about 10,000 psi (about 70 MPa). Further, the dispersion thus obtained was centrifuged (12,000 rpm, for 20 minutes) to thereby remove undispersed matter containing coarse particles, to obtain magenta colored, Pigment Dispersion 2. Pigment Dispersion 2 obtained had a pigment concentration of 10% and a dispersant concentration of 5%.

Preparation of Ink 2:

To prepare Ink 2, the magenta colored, Pigment Dispersion 2 obtained as above was used and the following components were added thereto so as to be in stated concentrations. These components were thoroughly mixed and stirred, and thereafter the mixture obtained was filtered under pressure by using a micro-filter (available from Fuji Photo Film Co., Ltd.) of 2.5 µm in pore size. As the result, Ink 2 was obtained, which had a pigment concentration of 4% and a dispersant concentration of 2%. Compound (6) used in the following composition is one having the following structure, and its EO moieties were in a proportion of 58% on the basis of mass.

| Compound (6): HO—(EO)$_3$—(PO)$_3$—(EO)$_3$—H | |
|---|---|
| Above Pigment Dispersion 2 | 40% |
| Compound (6) | 12% |
| Polyethylene glycol | 6% |
| (average molecular weight: 300) | |
| Ethylene urea | 4% |
| Acetylene glycol EO adduct | 0.6% |
| (trade name; ACETYLENOL EH, available from | |
| Kawaken Fine Chemicals Co., Ltd.) | |
| Ion-exchanged water | balance |

Example 3

Preparation of Pigment Dispersion 3:

First, using benzyl acrylate and methacrylic acid as raw materials, an AB type block polymer having an acid value of 300 and a weight average molecular weight of 4,000 was produced by a conventional method. This was further neutralized with an aqueous potassium hydroxide solution, and diluted with ion-exchanged water to make up a homogeneous aqueous 50% polymer solution. Then, 110 g of the aqueous polymer solution obtained, 100 g of C.I. Pigment Yellow 128 and 290 g of ion-exchanged water were mixed, and then stirred by a mechanical means for 0.5 hour. Next, using a micro-fluidizer, the mixture obtained was treated by passing it five times through the interior of an interaction chamber under a liquid pressure of about 10,000 psi (about 70 MPa). Further, the dispersion thus obtained was centrifuged (12,000 rpm, for 20 minutes) to thereby remove undispersed matter containing coarse particles, to obtain yellow colored, Pigment Dispersion 3. Pigment Dispersion 3 obtained had a pigment concentration of 10% and a dispersant concentration of 6%.

Preparation of Ink 3:

To prepare Ink 3, the yellow colored, Pigment Dispersion 3 obtained as above was used and the following components were added thereto so as to be in stated concentrations. These components were thoroughly mixed and stirred, and thereafter the mixture obtained was filtered under pressure by using a micro-filter (available from Fuji Photo Film Co., Ltd.) of 2.5 µm in pore size. As the result, Ink 3 was obtained, which had a pigment concentration of 5% and a dispersant concentration of 3%. Compound (8) used in the following composition is one having the following structure, and its EO moieties were in a proportion of 58% on the basis of mass.

| Compound (8): HO—(EO)$_4$—(PO)$_4$—(EO)$_4$—H | |
|---|---|
| Above Pigment Dispersion 3 | 50% |
| Compound (8) | 8% |
| 1,6-Hexanediol | 6% |
| Triethylene glycol | 4% |
| Acetylene glycol EO adduct | 0.3% |
| (trade name; ACETYLENOL EH, available from | |
| Kawaken Fine Chemicals Co., Ltd.) | |
| Polyoxyethylene cetyl ether | 1.0% |
| (number of EO addition: 30; HLB: 19.5) | |
| Ion-exchanged water | balance |

Example 4

Preparation of Pigment Dispersion 4:

First, using benzyl methacrylate, methacrylic acid and ethoxyethylene glycol methacrylate as raw materials, an ABC type block polymer having an acid value of 350 and a weight average molecular weight of 5,000 was produced by a conventional method. This was further neutralized with an aqueous potassium hydroxide solution, and diluted with ion-exchanged water to make up a homogeneous aqueous 50% polymer solution. Then, 60 g of the aqueous polymer solution obtained, 100 g of carbon black and 340 g of ion-exchanged water were mixed, and then stirred by a mechanical means for 0.5 hour. Next, using a micro-fluidizer, the mixture obtained was treated by passing it five times through the interior of an interaction chamber under a liquid pressure of about 10,000 psi (about 70 MPa). Further, the dispersion thus obtained was centrifuged (12,000 rpm, for 20 minutes) to thereby remove undispersed matter containing coarse particles, to obtain black colored, Pigment Dispersion 4. Pigment Dispersion 4 obtained had a pigment concentration of 10% and a dispersant concentration of 3.5%.

Preparation of Ink 4:

To prepare Ink 4, the black colored, Pigment Dispersion 4 obtained as above was used and the following components were added thereto so as to be in stated concentrations. These components were thoroughly mixed and stirred, and thereafter the mixture obtained was filtered under pressure by using a micro-filter (available from Fuji Photo Film Co., Ltd.) of 2.5 µm in pore size. As the result, Ink 4 was obtained, which had a pigment concentration of 3% and a dispersant concentration of 1.05%. Compound (10) used in the following composition is one having the following structure, and its EO moieties were in a proportion of 59% on the basis of mass.

| Compound (10): HO—(EO)$_5$—(PO)$_5$—(EO)$_5$—H | |
|---|---|
| Above Pigment Dispersion 4 | 30% |
| Compound (10) | 8% |
| Trimethylol propane | 6% |
| Polyethylene glycol | 2% |
| (average molecular weight: 200) | |
| Polyoxyethylene cetyl ether | 2% |
| (number of EO addition: 30; HLB: 19.5) | |
| Ion-exchanged water | balance |

Example 5

Preparation of Ink 5:

The following components were thoroughly mixed and stirred to prepare Ink 5. Compound (14) in the following composition is one having the following structure, and its EO moieties were in a proportion of 60% on the basis of mass.

| Compound (14): HO—(EO)$_6$—(PO)$_{12}$—(EO)$_{18}$—H | |
|---|---|
| C.I. Direct Blue 199 | 3.5% |
| Compound (14) | 4% |
| Diglycerol | 6% |
| Ethylene urea | 8% |
| Acetylene glycol EO adduct | 1% |
| (trade name; ACETYLENOL EH, available from | |
| Kawaken Fine Chemicals Co., Ltd.) | |
| Ion-exchanged water | balance |

Example 6

Preparation of Ink 6:

The following components were thoroughly mixed and stirred to prepare Ink 6. Compound (3) in the following composition is one having the following structure, and its EO moiety was in a proportion of 72% on the basis of mass.

| Compound (3): HO—(PO)$_2$—(EO)$_8$—H | |
|---|---|
| C.I. Acid Red 289 | 3% |
| Compound (3) | 15% |
| Ethylene urea | 4% |
| Acetylene glycol EO adduct | 1.2% |
| (trade name; ACETYLENOL EH, available from Kawaken Fine Chemicals Co., Ltd.) | |
| Ion-exchanged water | balance |

Example 7

Preparation of Ink 7:

The following components were thoroughly mixed and stirred to prepare Ink 7. Compound (13) in the following composition is one having the following structure, and its EO moieties were in a proportion of 80% on the basis of mass.

| Compound (13): HO—(EO)$_{20}$—(PO)$_{11}$—(EO)$_{40}$—H | |
|---|---|
| C.I. Direct Yellow 132 | 3% |
| Compound (13) | 3% |
| Bishydroxyethyl sulfone | 9% |
| Polyethylene glycol | 5% |
| (average molecular weight: 300) | |
| Acetylene glycol EO adduct | 1.2% |
| (trade name; ACETYLENOL EH, available from Kawaken Fine Chemicals Co., Ltd.) | |
| Ion-exchanged water | balance |

Example 8

Preparation of Ink 8:

The following components were thoroughly mixed and stirred to prepare Ink 8. Compound (4) in the following composition is one having the following structure, and its EO moiety was in a proportion of 25% on the basis of mass.

| Compound (4): HO—(PO)$_2$—(EO)$_1$—H | |
|---|---|
| C.I. Food Black 2 | 2.5% |
| Compound (4) | 25% |
| Acetylene glycol EO adduct | 1.0% |
| (trade name; ACETYLENOL EH, available from Kawaken Fine Chemicals Co., Ltd.) | |
| Ion-exchanged water | balance |

Comparative Example 1

Preparation of Ink 9:

Ink 9 was obtained in the same manner as in Example 1 except that Compound (1) used in Example 1 was changed for diethylene glycol to give the following composition.

| | |
|---|---|
| Pigment Dispersion 1 | 20% |
| Diethylene glycol | 16% |
| Acetylene glycol EO adduct | 0.5% |
| (trade name; ACETYLENOL EH, available from Kawaken Fine Chemicals Co., Ltd.) | |
| Polyoxyethylene cetyl ether | 0.5% |
| (number of EO addition: 30; HLB: 19.5) | |
| Ion-exchanged water | balance |

Comparative Example 2

Preparation of Ink 10:

Ink 10 was obtained in the same manner as in Example 2 except that the content of the acetylene glycol ethylene oxide addition product used in Example 2 was changed to give the following composition.

| | |
|---|---|
| Pigment Dispersion 2 | 40% |
| Compound (6) | 12% |
| Polyethylene glycol | 6% |
| (average molecular weight: 300) | |
| Ethylene urea | 4% |
| Acetylene glycol EO adduct | 0.5% |
| (trade name; ACETYLENOL EH, available from Kawaken Fine Chemicals Co., Ltd.) | |
| Ion-exchanged water | balance |

Comparative Example 3

Preparation of Ink 11:

Ink 11 was obtained in the same manner as in Example 2 except that the content of the acetylene glycol ethylene oxide addition product used in Example 2 was changed to give the following composition.

| | |
|---|---|
| Pigment Dispersion 2 | 40% |
| Compound (6) | 12% |
| Polyethylene glycol | 6% |
| (average molecular weight: 300) | |
| Ethylene urea | 4% |
| Acetylene glycol EO adduct | 5.5% |
| (trade name; ACETYLENOL EH, available from Kawaken Fine Chemicals Co., Ltd.) | |
| Ion-exchanged water | balance |

Comparative Example 4

Preparation of Ink 12:

Ink 12 was obtained in the same manner as in Example 3 except that Compound (8) used in Example 3 was changed for tetraethylene glycol to give the following composition.

| | |
|---|---|
| Pigment Dispersion 3 | 50% |
| Tetraethylene glycol | 8% |
| 1,6-Hexanediol | 6% |
| Triethylene glycol | 4% |
| Acetylene glycol EO adduct | 0.3% |
| (trade name; ACETYLENOL EH, available from Kawaken Fine Chemicals Co., Ltd.) | |
| Polyoxyethylene cetyl ether | 1.0% |
| (number of EO addition: 30; HLB: 19.5) | |
| Ion-exchanged water | balance |

Comparative Example 5

Preparation of Ink 13:

Ink 13 was obtained in the same manner as in Example 7 except that Compound (13) used in Example 7 was changed for Compound (15) having the structure shown below, to give the following composition. The EO moieties of Compound (15) were in a proportion of 81% on the basis of mass.

| Compound (15): HO—(EO)$_{25}$—(PO)$_{11}$—(EO)$_{40}$—H | |
|---|---|
| C.I. Direct Yellow 132 | 3% |
| Compound (15) | 3% |
| Bishydroxyethyl sulfone | 9% |
| Polyethylene glycol | 5% |
| (average molecular weight: 300) | |
| Acetylene glycol EO adduct | 1.2% |
| (trade name; ACETYLENOL EH, available from | |
| Kawaken Fine Chemicals Co., Ltd.) | |
| Ion-exchanged water | balance |

Comparative Example 6

Preparation of Ink 14:

Ink 14 was obtained in the same manner as in Example 1 except that Compound (1) used in Example 1 was changed for Compound (16) having the structure shown below, to give the following composition. The EO moieties of Compound (16) were in a proportion of 70% on the basis of mass.

| Compound (16): HO—(EO)$_2$—(PO)$_1$—(EO)$_2$—H | |
|---|---|
| Above Pigment Dispersion 1 | 20% |
| Compound (16) | 16% |
| Acetylene glycol EO adduct | 0.5% |
| (trade name; ACETYLENOL EH, available from | |
| Kawaken Fine Chemicals Co., Ltd.) | |
| Polyoxyethylene cetyl ether | 0.5% |
| (number of EO addition: 30; HLB: 19.5) | |
| Ion-exchanged water | balance |

Comparative Example 7

Preparation of Ink 15:

Ink 15 was obtained in the same manner as in Example 5 except that Compound (14) used in Example 5 was changed for Compound (17) having the structure shown below, to give the following composition. The EO moieties of Compound (17) were in a proportion of 58% on the basis of mass.

| Compound (17): HO—(EO)$_6$—(PO)$_{13}$—(EO)$_{18}$—H | |
|---|---|
| C.I. Direct Blue 199 | 3.5% |
| Compound (17) | 4% |
| Diglycerol | 6% |
| Ethylene urea | 8% |
| Acetylene glycol EO adduct | 1% |
| (trade name; ACETYLENOL EH, available from | |
| Kawaken Fine Chemicals Co., Ltd.) | |
| Ion-exchanged water | balance |

Comparative Example 8

Preparation of Ink 16:

Ink 16 was obtained in the same manner as in Example 5 except that Compound (14) used in Example 5 was changed for Compound (18) having the structure shown below, to give the following composition. The EO moiety of Compound (18) was in a proportion of 6% on the basis of mass.

| Compound (18): HO—(PO)$_{12}$—(EO)$_1$—H | |
|---|---|
| C.I. Direct Blue 199 | 3.5% |
| Compound (18) | 4% |
| Diglycerol | 6% |
| Ethylene urea | 8% |
| Acetylene glycol EO adduct | 1% |
| (trade name; ACETYLENOL EH, available from | |
| Kawaken Fine Chemicals Co., Ltd.) | |
| Ion-exchanged water | balance |

Comparative Example 9

Preparation of Ink 17:

Ink 17 was obtained in the same manner as in Example 5 except that Compound (14) used in Example 5 was changed for Compound (19) having the structure shown below, to give the following composition. The EO moieties of Compound (19) were in a proportion of 85% on the basis of mass.

| Compound (19): HO—(EO)$_6$—(PO)$_3$—(EO)$_{18}$—H | |
|---|---|
| C.I. Direct Blue 199 | 3.5% |
| Compound (19) | 4% |
| Diglycerol | 6% |
| Ethylene urea | 8% |
| Acetylene glycol EO adduct | 1% |
| (trade name; ACETYLENOL EH, available from | |
| Kawaken Fine Chemicals Co., Ltd.) | |
| Ion-exchanged water | balance |

The structures of the compounds used in Comparative Examples are shown together in Table 2, utilizing the formula (I).

$$HO—(EO)_a—(PO)_b—(EO)_c—H \qquad (I)$$

TABLE 2

Numbers Represented by a, b and c in Formula (I) of Compounds Used in Comparative Examples, and EO Moiety Proportion in the Compounds

| | a | b | c | a + c | EO moiety proportion (%) |
|---|---|---|---|---|---|
| Compound (15) | 25 | 11 | 40 | 65 | 81 |
| Compound (16) | 2 | 1 | 2 | 4 | 70 |
| Compound (17) | 6 | 13 | 18 | 24 | 58 |
| Compound (18) | 0 | 12 | 1 | 1 | 6 |
| Compound (19) | 6 | 3 | 18 | 24 | 85 |

Evaluation

Each ink of Examples 1 to 8 (Inks 1 to 8) and Comparative Examples 1 to 9 (Inks 9 to 17) were evaluated in the following way. The ink-jet recording apparatus shown in FIG. 1 was used in the evaluation on items (1) to (3). Incidentally, the ink-jet recording head used here had a recording density of 1,200 dpi and an ejection volume of 4 pl per dot.

Evaluation Items (1) Frequency response:

Using an ink-jet recording apparatus of a thermal system, manufactured by CANON INC., each ink was ejected at a drive frequency of 0.1 kHz, and the drive frequency was gradually made higher. At the time in point where the ejection became so unstable that the shape of ejected droplets came to a shape in which primary droplets are no longer present, the drive frequency was measured to make evaluation according to the following criteria. The results of evaluation are shown together in Table 3.

(3) curling resistance:

A solid image was printed on A4 size plain paper (SW-101, available from CANON INC.), leaving blanks of 2 cm in width at the top and bottom, and right and left, of the sheet. The recording apparatus described above was used. The recording area of the plain paper is 431.8 cm$^2$ and an ink application amount is 1.36 mg/cm$^2$. The recorded material obtained was placed in an environment of 25° C. and 55%RH, and left as it was. Then, how it stood after 1 hour and after 10 days was observed to make visual evaluation. Criteria of the evaluation are as shown below. The results of evaluation are shown together in Table 3.

A: The sheet is kept to stand substantially flat.
B: The sheet stands curved up at its edge portions.
C: The sheet is in the shape of a cylinder.

TABLE 3

| | | Evaluation results | | | | |
|---|---|---|---|---|---|---|
| | | | | (3) Curling resistance | | |
| | | (1) Frequency res. | (2) Sticking res. | After 1 hr. | After 10 days | Factor comparison with Example |
| Example: | | | | | | |
| 1 | Ink 1 | A | A | A | A | — |
| 2 | Ink 2 | A | A | A | A | — |
| 3 | Ink 3 | A | A | A | A | — |
| 4 | Ink 4 | A | A | A | A | — |
| 5 | Ink 5 | A | A | A | A | — |
| 6 | Ink 6 | A | A | A | A | — |
| 7 | Ink 7 | A | A | A | A | — |
| 8 | Ink 8 | A | A | A | A | — |
| Comparative Example: | | | | | | |
| 1 | Ink 9 | A | B | B | C | No compound of formula (1). |
| 2 | Ink 10 | B | A | A | A | Surfactant 0.5%. |
| 3 | Ink 11 | C | C | A | B | Surfactant 5.5%. |
| 4 | Ink 12 | B | A | A | B | No compound of formula (1). |
| 5 | Ink 13 | B | B | A | A | a + b = 65 in f.(1), EO proportn.: 81%. |
| 6 | Ink 14 | B | A | A | B | b = 1 in f.(1). |
| 7 | Ink 15 | B | B | A | A | b = 13 in f.(1). |
| 8 | Ink 16 | C | C | B | B | EO proportion: 6%. |
| 9 | Ink 17 | B | A | A | A | EO proportn.: 85%. |

A: More than 10 kHz.
B: 5 kHz or more to 10 kHz or less.
C: Less than 5 kHz.

(2) Sticking resistance:

The head holding therein each ink, mounted to the recording apparatus described above, was detached from its main body, and was left for a week in an environment of 35° C. and 10% RH. Thereafter, this head was mounted to the recording apparatus, and whether or not the printing was restorable by usual restoration motion was checked to make evaluation of sticking resistance in each ink. Criteria of the evaluation are as shown below. The results of evaluation are shown together in Table 3.

A: Restored by restoration motion taken once.
B: Restored by restoration motion taken several times.
C: Not restored by restoration motion taken in the main body.

From the results of the evaluations (1) to (3) as shown in Table 3, it has been confirmed that Inks 1 to 8 according to Examples 1 to 8 all have good ink-jet ejection performance and curling resistance. On the other hand, from the results of Comparative Examples 1 to 9, it has been confirmed that inks in which the content of the surfactant used is outside the prescription or which contain a compound whose number of addition of ethylene oxide or propylene oxide or mass proportion of the ethylene oxide moiety/-ies are outside the range of the present invention show insufficient curling resistance, or, even in instances in which some show good curling resistance, have problems on the sticking resistance and on the response at the time of high drive frequency ink ejection.

This application claims priority from Japanese Patent Application No. 2005-086916 filed Mar. 24, 2005, which is hereby incorporated by reference herein.

What is claimed is:

1. An ink-jet recording ink comprising water, a coloring material and a surfactant, wherein;

said surfactant is in a content of from 0.6 to 5% by mass in the ink, and said ink further comprises a block compound represented by the following formula (I):

$$HO-(EO)_a-(PO)_b-(EO)_c-H \qquad (I)$$

wherein EOs each represent an ethylene oxide moiety; PO represents a propylene oxide moiety; a, b and c satisfy $a \geq 0$, $2 \leq b \leq 12$, $c \geq 0$ and $1 \leq a+c \leq 60$; and the ethylene oxide moiety/-ies in one molecule is/are in a proportion of from 20 to 80% on the basis of mass.

2. The ink-jet recording ink according to claim 1, wherein said surfactant is a nonionic surfactant.

3. An ink-jet recording process comprising the step of applying an ink to a cellulose-containing recording medium to perform recording by using an ink-jet recording head, wherein;

the recording area of said recording medium is 15 cm² or more, and said ink is in an ink application amount of from 0.03 to 30 mg/cm²; and said ink comprises water, a coloring material and a surfactant, said surfactant is in a content of from 0.6 to 5% by mass in the ink, and said ink further comprises a block compound represented by the following formula (I):

$$HO-(EO)_a-(PO)_b-(EO)_c-H \qquad (I)$$

wherein EOs each represent an ethylene oxide moiety; PO represents a propylene oxide moiety; a, b and c satisfy $a \geq 0$, $2 \leq b \leq 12$, $c \geq 0$ and $1 \leq a+c \leq 60$; and the ethylene oxide moiety/-ies in one molecule is/are in a proportion of from 20 to 80% on the basis of mass.

4. The ink-jet recording process according to claim 3, wherein the ink application amount is in the range of from 0.1 to 20 mg/cm².

5. The ink-jet recording process according to claim 3, wherein said surfactant is a nonionic surfactant.

6. The ink-jet recording process according to claim 3, wherein said cellulose-containing recording medium is plain paper.

7. The ink-jet recording process according to claim 3, wherein said ink-jet recording head is a thermal ink-jet recording head.

8. An ink-jet recording apparatus comprising an ink storage portion holding therein the ink according to claim 1, and an ink-jet recording head from which the ink is to be ejected.

9. The ink-jet recording apparatus according to claim 8, wherein said ink-jet recording head is a thermal ink-jet recording head.

* * * * *